United States Patent
Hwang et al.

[11] Patent Number: 6,141,641
[45] Date of Patent: Oct. 31, 2000

[54] DYNAMICALLY CONFIGURABLE ACOUSTIC MODEL FOR SPEECH RECOGNITION SYSTEM

[75] Inventors: Mei-Yuh Hwang, Redmond; Xuedong D. Huang, Woodinville, both of Wash.

[73] Assignee: Microsoft Corporation, Redmond, Wash.

[21] Appl. No.: 09/060,654

[22] Filed: Apr. 15, 1998

[51] Int. Cl.[7] .................................................. G10L 15/06
[52] U.S. Cl. ........................ 704/243; 704/257; 704/245; 704/244
[58] Field of Search ..................... 704/231, 254, 704/255, 256, 257, 243, 244, 245, 251, 253, 242

[56] References Cited

U.S. PATENT DOCUMENTS

| | | | |
|---|---|---|---|
| 4,797,929 | 1/1989 | Gerson et al. | 704/243 |
| 5,033,087 | 7/1991 | Bahl et al. | 704/256 |
| 5,353,377 | 10/1994 | Kuroda et al. | 704/256 |
| 5,440,663 | 8/1995 | Moese et al. | 704/256 |
| 5,710,866 | 1/1998 | Alleva et al. | 704/256 |
| 5,794,197 | 8/1998 | Alleva et al. | 704/255 |
| 5,806,030 | 9/1998 | Junqua | 704/245 |
| 5,822,730 | 10/1998 | Roth et al. | 704/255 |
| 5,899,973 | 5/1999 | Bandara et al. | 704/256 |
| 5,950,158 | 9/1999 | Wang | 704/244 |
| 5,963,902 | 10/1999 | Wang | 704/243 |

FOREIGN PATENT DOCUMENTS

| | | |
|---|---|---|
| 0 709 826 A1 | 5/1996 | European Pat. Off. . |
| WO 97/17694 | 5/1997 | WIPO . |

OTHER PUBLICATIONS

Lee, K.F., "Context–Dependent Phonetic Hidden Markov Models for Continuous Speech Recognition", *IEEE Transactions on ASSP*, Apr. 1990, pp. 599–609.

Young, S.J., Odell J.J., Woodland P.C., "Tree–Based State Typing for High Accuracy Acoustic Modeling", Proceedings of ARPA Human Language Technology Workshop, Mar. 1994, pp. 307–312.

Mei–Yuh Hwang et al., "Predicting Unseen Triphones With Senones", *IEEE International Conference on Acoustics, Speech, and Signal Processing*, Apr. 1993, pp. II–311 through II–314.

"Dynamically Configurable Acoustic Models For Speech Recognition", by Mei–Yuh Hwang and Xuedong Huang, *IEEE*, vol. 2, 1998, pp. 669–672.

*Primary Examiner*—David R. Hudspeth
*Assistant Examiner*—Abul K. Azad
*Attorney, Agent, or Firm*—Joseph R. Kelly; Westman, Champlin & Kelly, P.A.

[57] ABSTRACT

The present invention includes a system for recognizing speech based on an input data stream. The system includes an acoustic model which has a model size. The model is adjustable to a desired size based on characteristics of a computer system on which the recognition system is run.

28 Claims, 5 Drawing Sheets

DYNAMICALLY CONFIGURABLE ACOUSTIC MODEL FOR SPEECH RECOGNITION SYSTEM

BACKGROUND OF THE INVENTION

The present invention relates to computer speech recognition. More particularly, the present invention relates to computer speech recognition using a dynamically configurable acoustic model in the speech recognition system.

The most successful current speech recognition systems employ probabilistic models known as hidden Markov models (HMMs). A hidden Markov model includes a plurality of states, wherein a transition probability is defined for each transition from each state to every states, including transitions to the same state. An observation is probabilistically associated with each unique state. The transition probabilities between states (the probabilities that an observation will transition from one state to the next) are not all the same. Therefore, a search technique, such as a Viterbi algorithm, is employed in order to determine a most likely state sequence for which the overall probability is maximum, given the transition probabilities between states and the observation probabilities.

A sequence of state transitions can be represented, in a known manner, as a path through a trellis diagram that represents all of the states of the HMM over a sequence of observation times. Therefore, given an observation sequence, a most likely path through the trellis diagram (i.e., the most likely sequence of states represented by an HMM) can be determined using a Viterbi algorithm.

In current speech recognition systems, speech has been viewed as being generated by a hidden Markov process. Consequently, HMMs have been employed to model observed sequences of speech spectra, where specific spectra are probabilistically associated with a state in an HMM. In other words, for a given observed sequence of speech spectra, there is a most likely sequence of states in a corresponding HMM.

This corresponding HMM is thus associated with the observed sequence. This technique can be extended, such that if each distinct sequence of states in the HMM is associated with a sub-word unit, such as a phoneme, then a most likely sequence of sub-word units can be found. Moreover, using models of how sub-word units are combined to form words, then using language models of how words are combined to form sentences, complete speech recognition can be achieved.

When actually processing an acoustic signal, the signal is typically sampled in sequential time intervals called frames. The frames typically include a plurality of samples and may overlap or be contiguous. Each frame is associated with a unique portion of the speech signal. The portion of the speech signal represented by each frame is analyzed to provide a corresponding acoustic vector. During speech recognition, a search is performed for the state sequence most likely to be associated with the sequence of acoustic vectors.

In order to find the most likely sequence of states corresponding to a sequence of acoustic vectors, an acoustic model is accessed and the Viterbi algorithm is employed. The Viterbi algorithm performs a computation which starts at the first frame and proceeds one frame at a time, in a time-synchronous manner. A probability score is computed for each state in the state sequences (i.e., the HMMs) being considered. Therefore, a cumulative probability score is successively computed for each of the possible state sequences as the Viterbi algorithm analyzes the acoustic signal frame by frame, based on the acoustic model. By the end of an utterance, the state sequence (or HMM or series of HMMs) having the highest probability score computed by the Viterbi algorithm provides the most likely state sequence for the entire utterance. The most likely state sequence is then converted into a corresponding spoken subword unit, word, or word sequence.

The Viterbi algorithm reduces an exponential computation to one that is proportional to the number of states and transitions in the model and the length of the utterance. However, for a large vocabulary, the number of states and transitions becomes large and the computation required to update the probability score at each state in each frame for all possible state sequences takes many times longer than the duration of one frame, which is typically approximately 10 milliseconds in duration.

Thus, a technique called pruning, or beam searching, has been developed to greatly reduce computation needed to determine the most likely state sequence. This type of technique eliminates the need to compute the probability score for state sequences that are very unlikely. This is typically accomplished by comparing, at each frame, the probability score for each remaining state sequence (or potential sequence) under consideration with the largest score associated with that frame. If the probability score of a state for a particular potential sequence is sufficiently low (when compared to the maximum computed probability score for the other potential sequences at that point in time) the pruning algorithm assumes that it will be unlikely that such a low scoring state sequence will be part of the completed, most likely state sequence. The comparison is typically accomplished using a minimum threshold value. Potential state sequences having a score that falls below the minimum threshold value are removed from the searching process. The threshold value can be set at any desired level, based primarily on desired memory and computational savings, and a desired error rate increase caused by memory and computational savings.

Another conventional technique for further reducing the magnitude of computation required for speech recognition includes the use of a prefix tree. A prefix tree represents the lexicon of the speech recognition system as a tree structure wherein all of the words likely to be encountered by the system are represented in the tree structure.

In such a prefix tree, each subword unit (such as a phoneme) is typically represented by a branch which is associated with a particular phonetic model (such as an HMM). The phoneme branches are connected, at nodes, to subsequent phoneme branches. All words in the lexicon which share the same first phoneme share the same first branch. All words which have the same first and second phonemes share the same first and second branches. By contrast, words which have a common first phoneme, but which have different second phonemes, share the same first branch in the prefix tree but have second branches which diverge at the first node in the prefix tree, and so on. The tree structure continues in such a fashion such that all words likely to be encountered by the system are represented by the end nodes of the tree (i.e., the leaves on the tree).

It can be seen that several of the above-described techniques are attempts to simplify and streamline computation in a speech recognition system. However, a computationally intensive computer system is still required in order to achieve a reasonably high degree of accuracy and real time response in performing the speech recognition task.

One portion of the speech recognition system which requires a high degree of computational resources is the acoustic model, and the process by which the acoustic model is accessed in order to determine a likely output corresponding to an input utterance.

One acoustic model which has been used in the past includes a plurality of senones. Development of senones is described in greater detail in Hwang, M. and Huang, X., "SUBPHONETIC MODELING WITH MARKOV-STATES SENONE", *IEEE International Conference on Acoustics, Speech, and Signal Processing*, Vol. I, 1992, pp. 33–36; and Hwang, M., Huang, X. and Alleva, F., "PREDICTING TRIPHONES WITH SENONES", *IEEE International Conference on Acoustics, Speech, and Signal Processing*, Vol. II, 1993, pp. 311–314.

Briefly, a senone tree is grown for each Markov state in each hidden Markov model used to model a speech unit. The parameters in the acoustic model associated with each Markov state are grouped, or clustered, based upon answers to a plurality of linguistic questions with a hierarchy arranged in a tree format. The resultant tree ends in leaves which include grouped or clustered parameters referred to as senones. There may typically be one senone tree in the speech recognition system for every Hidden Markov state in every phoneme (or other phonetic sub-word unit). That may typically result in approximately 120 senone trees.

Where discrete Hidden Markov models, or semi-continuous Hidden Markov models, are used, each leaf in the senone tree is represented by a single, discrete output distribution with n entries. For continuous Hidden Markov models, with a mixture of Gaussian density functions, each leaf on the senone tree is represented by m weighted Gaussian density functions. Each Gaussian density function is, in turn, parameterized by its mean vector and its covariance matrix. The acoustic model is typically trained using a maximum likelihood training technique, such as the Baum-Welch technique utilizing a corpus of training data.

In a relatively large, highly accurate, research speech recognition system, the senones in the acoustic model include approximately 120 k Gaussians (including means and covariances) which consume approximately 30 megabytes of memory.

However, such an acoustic model is typically much too large to be practically implemented on many conventional desktop computers. In order to provide a speech recognition system of practical size, which requires practical computational resources in terms of memory and speed, smaller and simpler acoustic models have been provided. The smaller and simpler acoustic models have traditionally been retrained from the raw training corpus and supplied to the user. This has typically been done by the developer of the speech recognition system and the simpler and smaller acoustic model has been provided in its final form to the eventual user. The reason this has typically been done by the developer is that the raw training corpus is a very large data corpus. Also, training an acoustic model based on such a corpus can be very computationally intensive. Thus, a typical user's system is not configured to handle such a large raw training corpus or to handle complete retraining of an acoustic model based on that corpus.

However, having the developer train the smaller acoustic model and provide it to the eventual user reduces flexibility. For instance, many users may wish to allocate a higher percentage of their available computational resources to a speech recognition task. Further, the eventual users will typically not all have the same, or maybe not even similar, system configurations in terms of available memory capacity and processor speed. Therefore, a user who has many computational resources, and wishes to trade those for increased speech recognition accuracy, cannot do so. By the same token, a user who has quite limited computational resources and wishes to trade off accuracy in order to conserve available computational resources, cannot do so.

SUMMARY OF THE INVENTION

The present invention includes a system for recognizing speech based on an input data stream. The system includes an acoustic model which has a model size. The model size is adjustable to a desired size based on characteristics of a computer on which the recognition system is run.

In one embodiment, the acoustic model includes a plurality of senones, and the model size is adjustable by combining parameters in descendent senones in order to reduce the number of parameters in the acoustic model. In yet another embodiment in which the acoustic model is based on continuous hidden Markov models, and wherein the senones are represented by Gaussian density functions, both means and covariances for the Gaussian density functions are combined. In another embodiment, only covariances are combined so that the number of parameters can be reduced without significantly sacrificing accuracy.

DETAILED DESCRIPTION OF THE PREFERRED EMBODIMENTS

The present invention provides a speech recognition system with a dynamically reconfigurable acoustic model. The acoustic model can be reconfigured based on the computational resources associated with a computer on which the speech recognition system is run. Further, the acoustic model can be dynamically reconfigured based on a user input indicative of an allocation of computational resources, made by the user and/or the operating system, to the speech recognition task.

Overview

Figure 1:
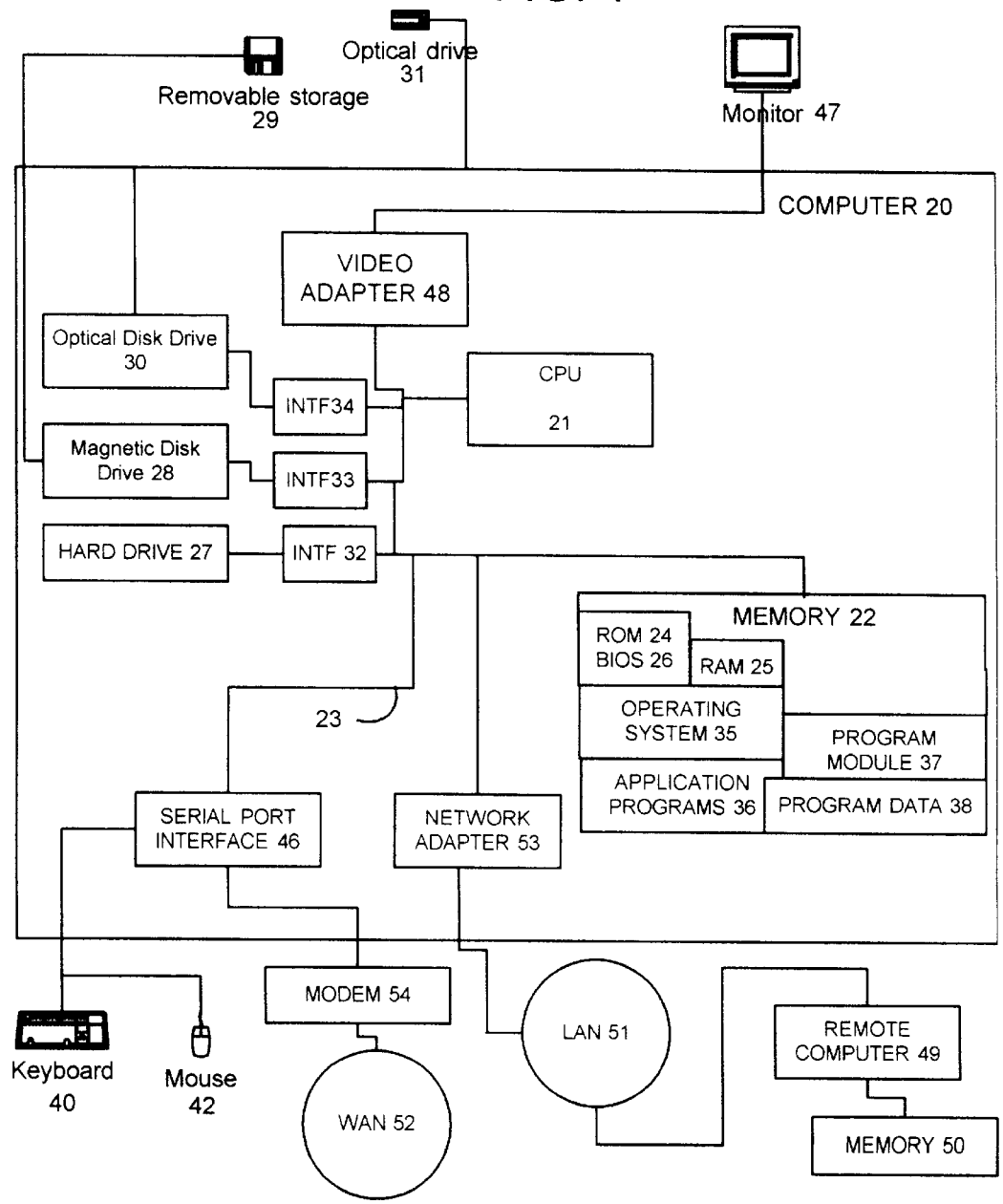
FIG. 1 is a block diagram of an exemplary environment for implementing the speech recognition system in accordance with the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and a random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40, pointing device 42 and microphone 62. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as speaker 45 and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Figure 2:
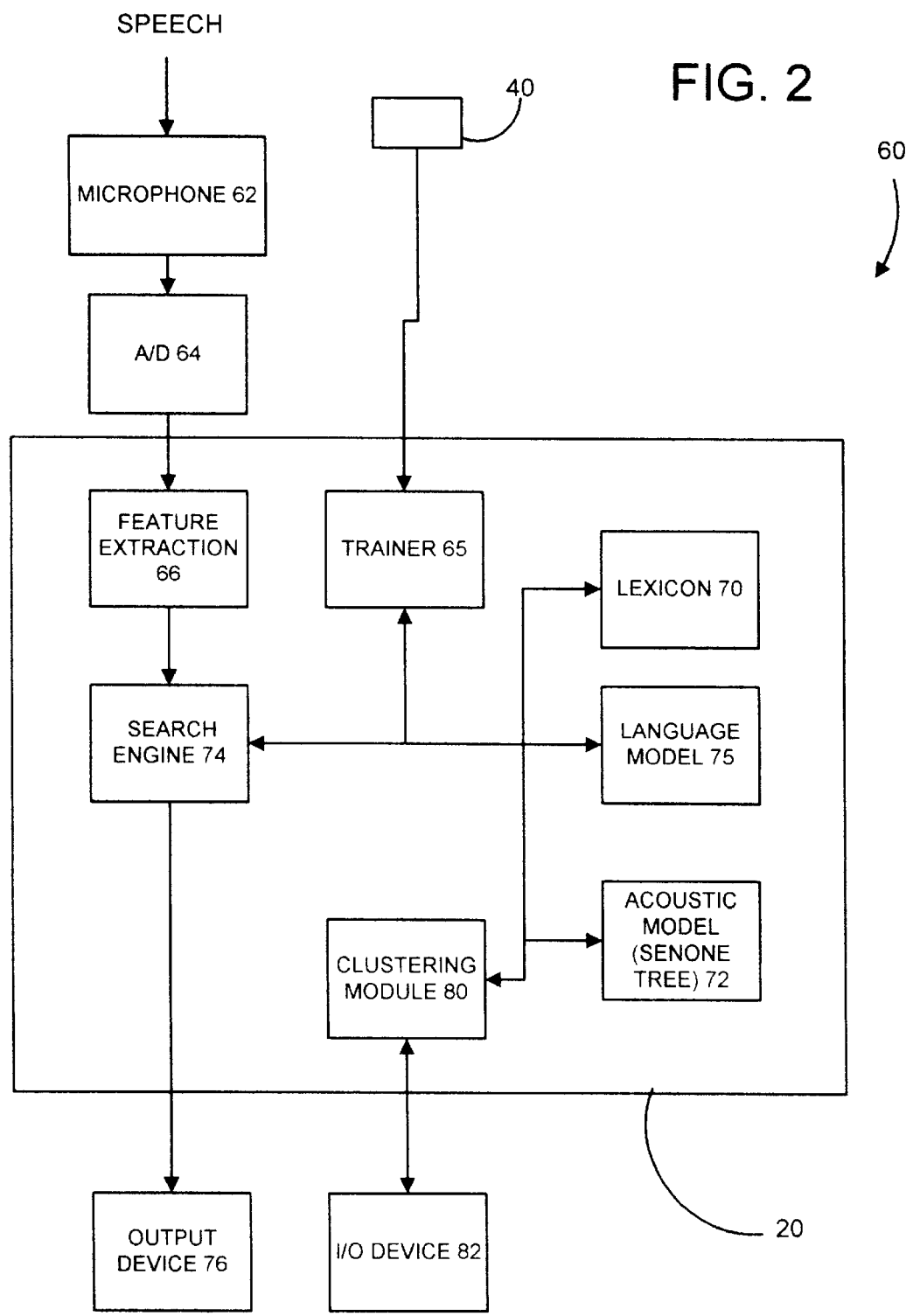
FIG. 2 is a more detailed block diagram of a portion of the system shown in FIG. 1.

FIG. 2 illustrates a block diagram of a speech recognition system 60 in accordance with one aspect of the present invention. Speech recognition system 60 includes microphone 62, analog-to-digital (A/D) converter 64, training module 65, feature extraction module 66, lexicon storage module 70, acoustic model (e.g., senone tree) 72, tree search engine 74, language model 75, output device 76, clustering module 80, and I/O device 82 (which may include one or more of the I/O devices described in FIG. 1 or which may be implemented in device 76 or keyboard 40).

It should be noted that the entire system 60, or part of system 60, can be implemented in the environment illustrated in FIG. 1. For example, microphone 62 may preferably be provided as an input device to personal computer 20, through an appropriate interface, and through A/D converter 64. Training module 65 and feature extraction module 66 may be either hardware modules in computer 20, or software modules stored in any of the information storage devices disclosed in FIG. 1 and accessible by CPU 21 or another suitable processor. In addition, lexicon storage module 70, acoustic model 72, and language model 75 are also preferably stored in any suitable memory devices shown in FIG. 1. Further, tree search engine 74 is preferably implemented in CPU 21 (which may include one or more processors) or may be performed by a dedicated speech recognition processor employed by personal computer 20. In addition, output devices 76 and 82 may, in one illustrative embodiment, be implemented as keyboard 40, monitor 47, or as a printer, or any other suitable input/output device.

In any case, during speech recognition, speech is input into system 60 in the form of an audible voice signal provided by the user to microphone 62. Microphone 62 converts the audible speech signal into an analog electronic signal which is provided to A/D converter 64. A/D converter 64 converts the analog speech signal into a sequence of digital signals which is provided to feature extraction module 66. In a preferred embodiment, feature extraction module 66 is a conventional array processor which performs spectral analysis on the digital signals and computes a magnitude value for each frequency band of a frequency spectrum. The signals are, in one illustrative embodiment, provided to feature extraction module 66 by A/D converter 64 at a sample rate of approximately 16 kHz. A/D converter 64 may be a commercially available, well known A/D converter.

Feature extraction module 66 divides the digital signal received from A/D converter 64 into frames which include a plurality of digital samples. Each frame is approximately 10 milliseconds in duration. The frames are then preferably encoded by feature extraction module 66 into a feature vector reflecting the spectral characteristics for a plurality of frequency bands. In the case of discrete and semi-continuous hidden Markov modeling, feature extraction module 66 also preferably encodes the feature vectors into one or more codewords using vector quantization techniques and a codebook derived from training data. Thus, feature extraction module 66 provides, at its output the feature vectors (or codewords) for each spoken utterance. The feature extraction module 66 preferably provides the feature vectors (or codewords) at a rate of one feature vector or (codeword) approximately every 10 milliseconds.

Output probability distributions are then preferably computed against hidden Markov models using the feature vector (or codewords) of the particular frame being analyzed. These probability distributions are later used in executing a Viterbi or similar type of technique.

Upon receiving the codewords from feature extraction model 66, tree search engine 74 access information stored in acoustic model 72. Model 72 stores acoustic models, such as Hidden Markov models, which represent speech units to be detected by system 60. In one embodiment, acoustic model 72 includes a senone tree associated with each Markov state in a Hidden Markov model. The Hidden Markov models represent, in one illustrative embodiment, phonemes. Based upon the senones in acoustic model 72, tree search engine 74 determines a most likely phoneme represented by the feature vector (or codeword) received from feature extraction module 66, and hence representative of the utterance received from the user of the system.

Tree search engine 74 also accesses the lexicon stored in module 70. The information received by tree search engine 74 based on its accessing of the acoustic model 72 is used in searching lexicon storage module 70 to determine a word which most likely represents the codewords or feature vectors received from feature extraction module 66. Also, search engine 74 preferably accesses the language model 75, which is illustratively a 60,000 word trigram language model derived from the North American Business News Corpus and set out in greater detail in a publication entitled CSR-III Text Language Model, University of Penn., 1994. The language model 75 is used in identifying a most likely word or word sequence represented by the input data. The word or word sequence determined is thus most likely representative of the utterance received by the user. The word or word sequence is then output by tree search engine 74 to output device 76.

Dynamic Configuration Of Acoustic Model 72

Prior to performing speech recognition, the acoustic model 72 is preferably dynamically configured to have a size which meets the constraints of the computer on which it is being run. In one illustrative example, a very detailed and highly accurate acoustic model is initially provided to the computer system. The size of the acoustic model is then adjusted (such as reduced) by combining parameters in the acoustic model until the acoustic model size is at a desired level.

Figure 3:
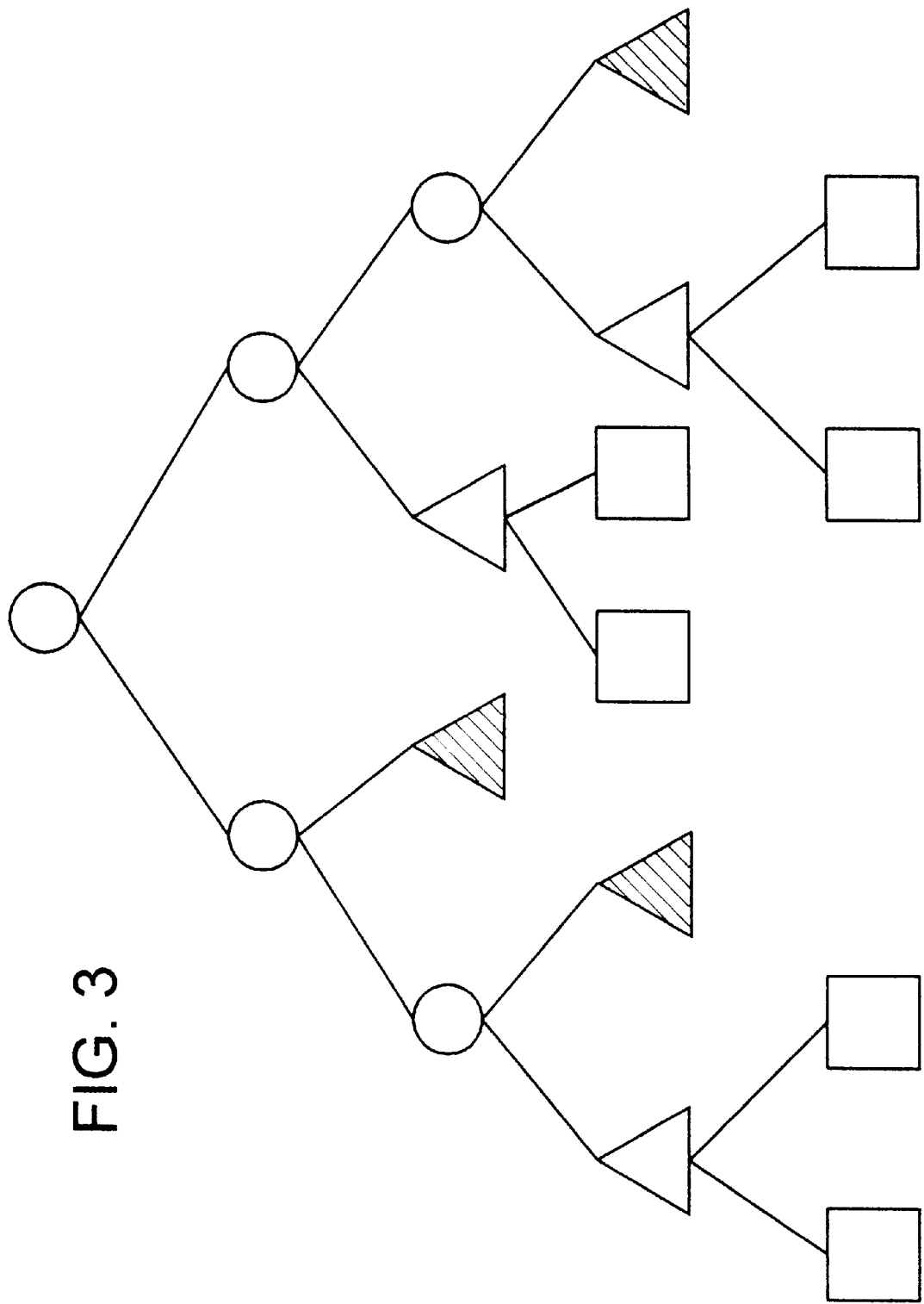
FIG. 3 is a simplified diagram illustrating a senone tree.

FIG. 3 illustrates one simplified embodiment of a senone tree representative of a portion of acoustic model 72. The circles in the senone tree represent nodes in the senone tree. Squares represent deep senones in the senone tree. Triangles represent shallow senones, and shaded triangles represent both a deep senone and a shallow senone in the senone tree. In one illustrative embodiment, the senone tree is initially grown to its deepest level to arrive at the deep senones. In other words, the senone tree is grown until it can no longer be any more well trained given the training corpus. This may typically take several experiments to plot a histogram of the error rate against parameter size on a development test set. Such a senone tree is grown for each state in a Hidden Markov model representative of a speech unit (such as a phoneme).

Then, based upon the constraints of the computer upon which the speech recognition system is to be run, the parameters in the deep senones in the senone tree are combined or clustered under some pre-chosen ancestor node (a shallow senone) to reduce the overall number of parameters in the acoustic model. As will be described later in the specification, this merging of parameters can be accomplished given only the statistical information provided in the senone tree, and without referring to the raw training corpus Where the Hidden Markov models are discrete Hidden Markov models, or semi-continuous Hidden Markov models, each deep senone is represented by a single, discrete output distribution with n entries. The output distributions for two selected deep senones, which are descended from a common ancestor shallow senone, are combined into one output distribution corresponding to the shallow senone.

Where the Hidden Markov models are continuous Hidden Markov models with a mixture of continuous density functions, such density functions are illustratively Gaussian density functions. In that case, each deep senone is represented by m weighted Gaussian density functions. Each Gaussian density function, in turn, is parameterized by its mean vector and a covariance matrix. Therefore, for each selected shallow senone, there are m Gaussians in each descendent senone. The m Gaussians in each descendent senone are combined into a smaller number of Gaussians in order to reduce the overall number of parameters. In one illustrative embodiment, both the means and covariances are merged or clustered, while in another illustrative embodiment, only the covariances are clustered.

Clustering Module 80

Figure 4:
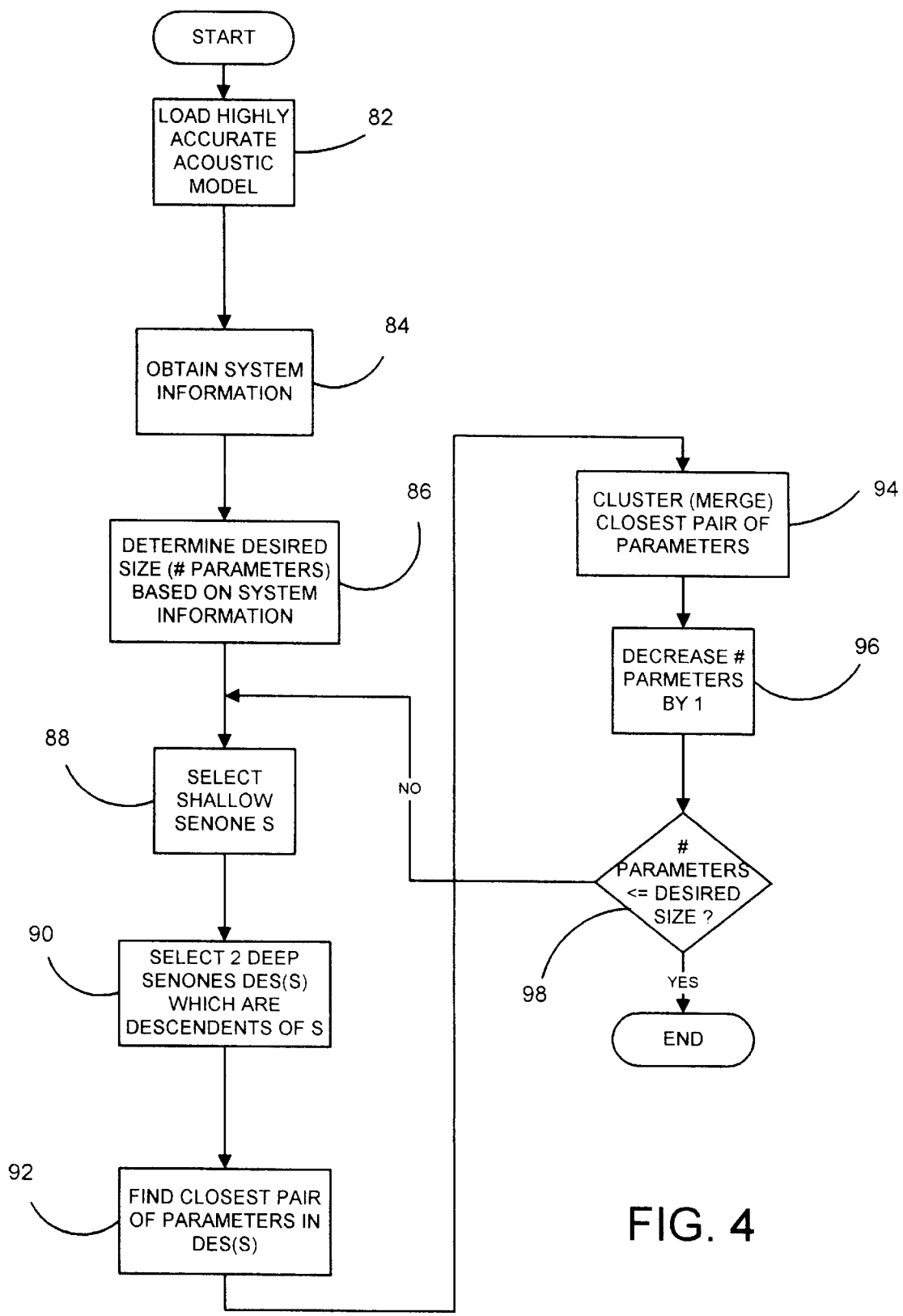
FIG. 4 is a flow diagram illustrating operation of a speech recognition system in accordance with one aspect of the present invention.

FIG. 4 is a flow diagram illustrating the overall operation of clustering module 80. First, the highly accurate and detailed acoustic model is provided to the computer on which it is to be used. This is indicated by block 82.

Clustering module 80 then obtains system information indicative of constraints on the computer in which the speech recognition system is run. In one embodiment, clustering module 80 simply accesses the relevant information in the operating system of the computer to determine how much memory is available in the computer, and to determine the operating speed of the processor used in the computer which will be executing the speech recognition task. In another preferred embodiment, clustering module 80 interacts with the user through input/output (I/O) device 82. In doing so, clustering module 80 asks the user to input information either representative of the resources available on the computer, or representative of the resources which the user wishes to allocate to the speech recognition task, or both. For example, clustering module 80 may request the user to input the amount of memory in the computer, the speed of the processor, the number of programs which the user wishes to run at any one time, the amount of memory available in the computer, the amount of memory the user wishes to allocate to the speech recognizer, etc. In any case, clustering module 80 receives the system information which is indicative of such constraints which are placed on the resources allocable to the speech recognition task. This is indicated by block 84.

Based upon this information, clustering module 80 determines an appropriate acoustic model size. In one illustrative embodiment, clustering module 80 determines this size in terms of the number of parameters to be implemented in the acoustic model. This is indicated by block 86.

Clustering module 80 then proceeds to select and cluster the parameters to achieve the desired number. In doing so, clustering module 80 first selects a shallow senone S, such as one of the shallow senones designated in FIG. 3. This is indicated by block 88. Clustering module 80 then finds those deep senones Des (S) which are descendants of shallow senone S. This is indicated by block 90. Clustering module 80 then clusters or merges parameters from the deep senones Des(S). In order to do this, clustering module 80 first finds a pair of parameters which are the closest among all parameters in the deep senones Des(S). By closest it is meant that combining the two parameters will result in the least reduction in the likelihood of generating the training data set aligned with those parameters. This is described in greater detail with respect to FIG. 5 and is indicated by block 92.

Once the closest pair of parameters is identified, those parameters are clustered or merged. This is indicated by block 94. The number of parameters in the acoustic model is then decreased by one. This is indicated by block 96.

Clustering module 80 then determines whether the number of parameters is less than or equal to the desired size of the acoustic model. If so, clustering is complete. If not, clustering module 80 selects another shallow senone and repeats the process to cluster or merge additional parameters. This is indicated by block 98.

Finding Closest Pair of Parameters

Figure 5:
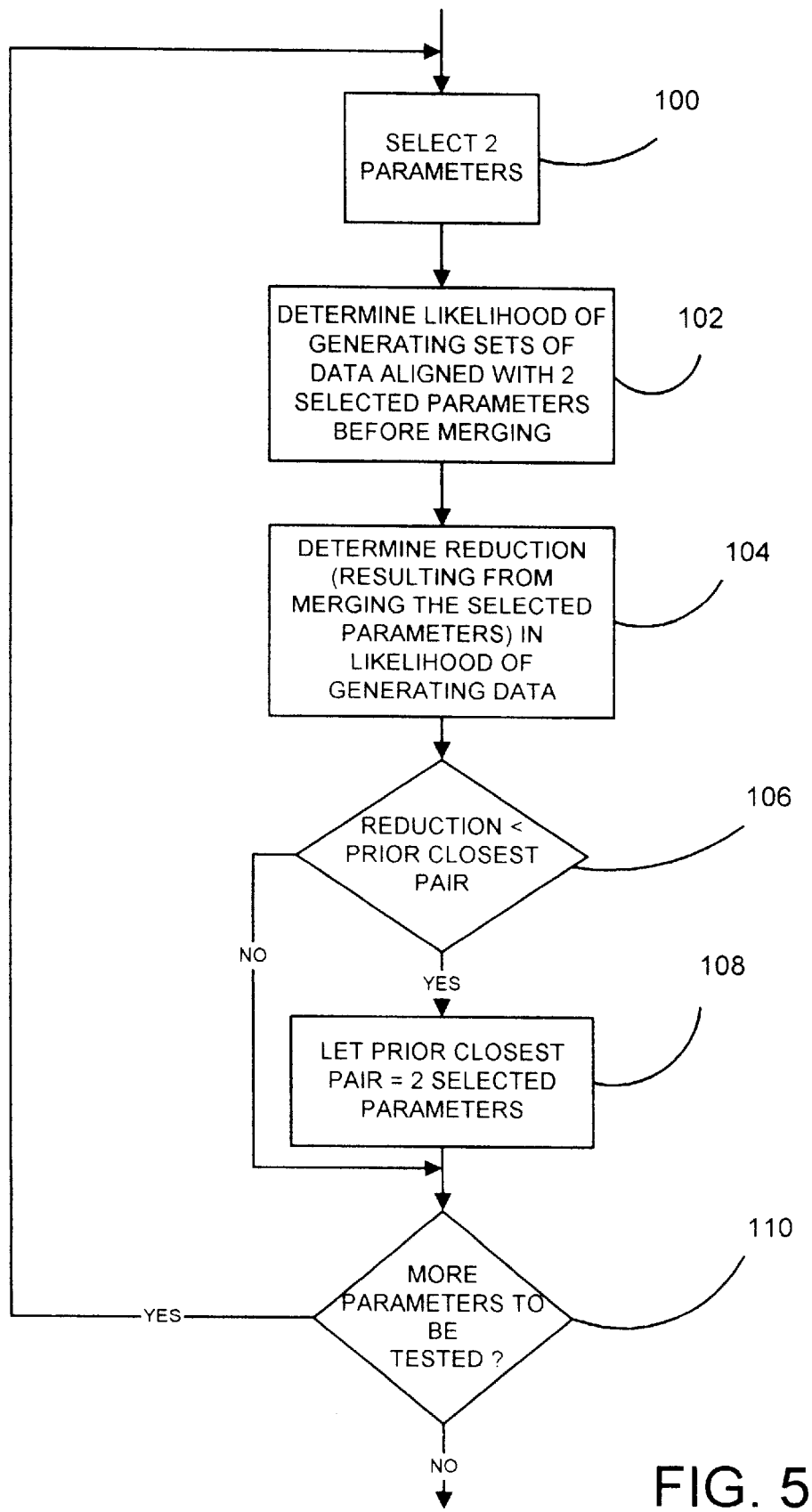
FIG. 5 is a flow diagram illustrating how a closest pair of parameters in the acoustic model are selected in accordance with one aspect of the present invention.

FIG. 5 is a flow diagram illustrating how clustering module 80 finds the closest pair of parameters for clustering or merging, as generally indicated by block 92 in FIG. 4. After identifying descendant senones Des(S), clustering module 80 selects two parameters from the descendant senones Des(S). This is indicated by block 100. Clustering module 80 then determines the likelihood of generating the sets of training data aligned with the two parameters, before merging the two parameters. This is indicated by block 102. Next, clustering module 80 determines a reduction in generating the sets of training data which results from merging the parameters. This is indicated by block 104. The steps indicated by blocks 102 and 104 may vary, in the illustrative embodiment, depending upon whether the Hidden Markov models used are discrete or semi-continuous Hidden Markov models, or whether they are continuous Hidden Markov models.

For discrete and semi-continuous Hidden Markov models, each deep senone is represented by one discrete output distribution with n entries. In order to determine the distance between two discrete output distributions, first assume that the occupancy count entries in one output distribution is $\{a_i\}$ with:

$$\sum_i a_i = A \qquad \text{Equation 1}$$

Similarly, for the second parameter (or output distribution) assume that the occupancy count entry is $\{b_I\}$ with:

$$\sum_i b_i = B \qquad \text{Equation 2}$$

Then, the likelihood of generating all the data aligned to the first output distribution is as follows:

$$L_A = \log \prod_{i=1}^{n} \left(\frac{a_i}{A}\right)^{a_i} \qquad \text{Equation 3}$$

$$= A \sum_{i=1}^{n} \left(\frac{a_i}{A}\right) \log\left(\frac{a_i}{A}\right)$$

$$= -AH(A)$$

where H(A) is the entropy of distribution A.

Similarly, the likelihood of generating all data aligned with the output distribution B is as follows:

$$L_B = \log \prod_{i=1}^{n} \left(\frac{b_i}{B}\right)^{b_i} \qquad \text{Equation 4}$$

$$= B \sum_{i=1}^{n} \left(\frac{b_i}{B}\right) \log\left(\frac{b_i}{B}\right)$$

$$= -BH(B)$$

After distributions A and B are merged, the resulting distribution has count entries $\{a_i+b_i\}$ with total count A+B. Thus, the loss or reduction in the likelihood of generating all the data that is aligned to deep senone A and all the data that is aligned to deep senone B, if A and B are merged, is:

$$\Delta L = L_A + L_B - L_{A+B} = (A+B)H(A+B) - AH(A) - BH(B) \geq 0 \qquad \text{Equation 5}$$

The smaller $\Delta L$ is, the less reduction in likelihood, and the closer the two distributions.

For continuous Hidden Markov models with Gaussian density functions, two different merging techniques can be used. The first is to merge both the means and covariances of the Gaussian density functions, while the second is to merge only the covariances, or to merge some means, but more covariances. For example, when the covariance is too small, the model becomes tailored too much to the training data and is thus not robust with the introduction of new test data. Further, it has been found that speech recognition accuracy is far less affected by the merging of covariances, than by the merging of means.

In the first illustrative embodiment, both means and covariances are to be merged. Thus, let X be the set of speech data aligned to a first Gaussian density function (Gaussian 1) with parameters:

$$N(\mu_1, \Sigma_1) \qquad \text{Equation 6}$$

with occupancy $\gamma(x)$;
where $\mu_1$=the mean of Gaussian 1;
$\Sigma_1$=the covariance of Gaussian 1.

Now, assume $$A = \sum_x \gamma(x) \qquad \text{Equation 7}$$

which equals the total occupancy of Gaussian 1 in the training data.

Further, assume that the Gaussian parameters were trained in a maximum likelihood fashion, such as with the Baum-Welch algorthm. Then, the likelihood of generating data X with Gaussian 1 is:

$$L_1 = \log \prod_{x \in X} N(x; \mu_1, \Sigma_1)^{\gamma(x)} = -(A/2)\{d \log 2\pi + \log|\Sigma_1| + d\} \qquad \text{Equation 8}$$

where d is the dimensionality of the feature vector x.

Similarly, for Gaussian 2, with data set Y, the likelihood of generating data Y with Gaussian 2 is:

$$L_2 = \log \prod_{y \in Y} N(y; \mu_2, \Sigma_2)^{\gamma(y)} = -(B/2)\{d \log 2\pi + \log|\Sigma_2| + d\} \qquad \text{Equation 9}$$

When the two Gaussians are merged, data X+Y are modeled by the following Gaussian with data occupancy count A+B, again if a maximum likelihood training technique is used:

$$\mu = \frac{A}{A+B}\mu_1 + \frac{B}{A+B}\mu_2 \qquad \text{Equation 10}$$

and $$\Sigma = \frac{A}{A+B}[\Sigma_1 + (\mu_1 - \mu)(\mu_1 - \mu)] + \qquad \text{Equation 11}$$
$$\frac{B}{A+B}[\Sigma_2 + (\mu_2 - \mu)(\mu_2 - \mu)]$$

and $$\Delta L = L_1 + L_2 - L_{1+2} \qquad \text{Equation 12}$$
$$= \frac{1}{2}\{(A+B)\log|\Sigma| - A\log|\Sigma_1| - B\log|\Sigma_2|\} \geq 0$$

where T is the matrix transport.

Thus, the loss in likelihood when the two Gaussians are merged is:

Equation 12

$$\Delta L = L_1 + L_2 - L_{1+2} = \frac{1}{2}\{(A+B)\log|\Sigma| - A\log|\Sigma_1| - B\log|\Sigma_2|\} \geq 0$$

Note that $\Sigma$ is computed in Equation 11 and is effected by $\mu_1$ and $\mu_2$. The smaller $\Delta L$ is, the less reduction in likelihood of generating the data, and the closer the two Gaussians.

In another illustrative embodiment, covariances are further combined, over and above the combinations of the means. In yet another illustrative embodiment, only covariances are merged. Each of these illustrative embodiments obtains the advantage of reducing the size of the acoustic model (by merging covariance parameters) without the loss in accuracy associated with reducing the number of means.

When two covariances are merged, but when the means are not (i.e., when data X is modeled by $N(\mu_1, \Sigma)$ and data Y is modeled by $N(\mu_2, \Sigma)$ the resulting maximum likelihood covariance is computed as follows:

$$\Sigma = \frac{A}{A+B}\Sigma_1 + \frac{B}{A+B}\Sigma_2 \qquad \text{Equation 13}$$

where A+B is the frequency weight.

It should be noted that the covariance computed in Equation 13 is not effected by the means, since the means are independently intact. Thus, a reduction in the likelihood of generating the data sets corresponding to the Gaussian density functions having the covariances merged is still computed as in Equation 12. This essentially indicates that, when merging or sharing covariances, only the closest covariance pair need be found, regardless of where the data is centered (i.e., regardless of the mean).

Referring again to FIG. 5, once reduction in the likelihood of generating the data set is determined based on merging of the parameters, and in order to find the two closest parameters to be merged, clustering module 80 determines whether the reduction computed in block 104 is less than that obtained by merging the prior closest pair which has been examined. This is indicated by block 106. If so, then it is determined that the current pair of parameters being examined is actually closer than the previous closest pair, and the current pair (i.e., the two selected parameters) are stored as the closest parameters. This is indicated by block 108.

If, in block 106, the reduction in likelihood resulting from merging the two currently selected parameters is not less then that based on merging of the prior closest pair, than the current selected parameters are not closer than the prior closest pair and the current pair are simply not merged at this time.

Clustering module 80 then determines whether any additional parameters are to be tested for merging. If so, clustering module 80 selects two additional parameters and repeats the steps illustrated in FIG. 5. If no more parameters remain for testing, then clustering module 80 simply continues by clustering the closest pair of parameters. This is indicated by block 110 in FIG. 5.

Test results have indicated that the present invention, which dynamically reduces the number of parameters in the acoustic model based upon system constraints, without referring to the raw training data and retraining a smaller acoustic model, provides increased accuracy over a retrained system. For example, a baseline system was built with a maximum likelihood trained acoustic model which included 6400 context dependent senones, with 12 Gaussians per senone. A second system was developed by training a simplified acoustic model based upon the raw training data. The simplified acoustic model included a maximum likelihood trained acoustic model having 3000 context dependent senones and 8 Gaussians per senone. This simplified system exhibited a 16% increase in error rate over the baseline system when subjected to the same test data as the baseline system.

By contrast, a system was also developed in accordance with the present invention in which a smaller acoustic model was generated from the baseline acoustic model, without retraining, and without access to the original raw training data. The smaller acoustic model, as with the retrained acoustic model, had 3,000 senones with 8 Gaussians per senone. However, the acoustic model developed in accordance with the present invention exhibited only an 11% error increase over the baseline system, as opposed to the 16% error increase exhibited by the retrained acoustic model.

Thus, the present invention provides an efficient and accurate system for dynamically downsizing an acoustic model of a speech recognition system to fit within a user's resource requirements. The present invention also provides a shared covariance model which can either reduce the memory requirement without an increase in the recognition error rate, or can enhance the performance by reallocating the space to more Gaussian means and mixture weights. The present invention clusters or mergers parameters by using likelihood loss, and the senone decision tree hierarchy to guide clustering. The smaller, reconfigured acoustic models are provided without retraining, and without providing access to the raw training data.

Although the present invention has been described with reference to preferred embodiments, workers skilled in the art will recognize that changes may be made in form and detail without departing from the spirit and scope of the invention, such as using other types of density functions for the CHMM output distributions.

What is claimed is:

1. A method of recognizing speech based on an input data stream, the method comprising:

providing a recognition system including an acoustic model having a model size;

adjusting the model size to a desired size based on characteristics of a computer system on which the recognition system is run based only on criteria other than a training data corpus used to train the acoustic model;

receiving the input data stream; and performing speech recognition based on the acoustic model having the desired size.

2. The method of claim 1 wherein the acoustic model includes a plurality of deep senones, indicative of leaf senones on a senone tree, having ancestor senones, indicative of predecessor senones on the senone trees, and being characterized by at least one parameter, and wherein adjusting the model size comprises:

selecting an ancestor senone;

identifying a plurality of deep senones which are descendents of the selected ancestor senone; and clustering parameters in the plurality of deep senones.

3. The method of claim 2 wherein identifying a plurality of deep senones comprises:

identifying a pair of parameters to be merged corresponding to the plurality of deep senones.

4. The method of claim 3 wherein each of the deep senones is represented by a single discrete output distribution and wherein identifying a pair of parameters to be merged comprises:

identifying a pair of output distributions to be merged based on an amount of reduction in likelihood of generating a dataset aligned with the pair of output distributions which results from merging the pair of output distributions.

5. The method of claim 4 wherein identifying a pair of output distributions to be merged comprises:

selecting first and second output distributions;

determining a likelihood of generating a first set of data and a second set of data, before merging the first and second selected output distributions, wherein the first set of data is aligned with the first selected output distribution and the second set of data is aligned with the second selected output distribution;

determining a reduction in the likelihood of generating the first and second sets of data after merging the first and second selected output distributions; and identifying the pair of output distributions to be merged based on the reduction in the likelihood of generating the first and second sets of data.

6. The method of claim 3 wherein each deep senone is represented by at least one continuous density function, wherein the parameters comprise characteristics of the continuous density function, and wherein identifying a pair of parameters to be merged comprises:

identifying a pair of characteristics to be merged based on a reduction in likelihood of generating a set of data corresponding to the pair of characteristics which results from merging the pair of characteristics.

7. The method of claim 6 wherein the continuous density function comprises a Gaussian density function, wherein the characteristics of the Gaussian density function comprise a mean and covariance corresponding to the Gaussian density function and wherein identifying a pair of parameters to be merged based on a reduction in likelihood comprises:

selecting a first Gaussian density function and a second Gaussian density function;

determining a likelihood of generating a first set of data corresponding to the first Gaussian density function and a second set of data corresponding to the second Gaussian density function before merging the means and covariances of the first and second Gaussian density functions;

determining a reduction in the likelihood of generating the first and second sets of data after merging the means and covariances of the first and second Gaussian density functions; and identifying a pair of at least one of means and covariances to be merged based on the reduction in the likelihood of generating the first and second sets of data.

8. The method of claim 7 wherein identifying a pair of at least one of means and covariances comprises:

initially identifying means and covariances to be merged; and then identifying additional covariances to be merged.

9. The method of claim 8 and further comprising:

identifying merged means to be expanded into unmerged means and still maintain the acoustic model at the desired size.

10. The method of claim 1 wherein adjusting the model size comprises:

adjusting the model size based on preselected computational resources on the computer system.

11. The method of claim 10 wherein adjusting the model size based on preselected computational resources comprises:

adjusting the model size based on a memory capacity and a speed of the computer system.

12. The method of claim 10 wherein adjusting the model size based on preselected computational resources, comprises:

providing a user request requesting system information indicative of the preselected computational resources;

receiving a user input containing the system information; and adjusting the model size based on the system information.

13. The method of claim 12 wherein the system information comprises a level of computer allocations the user desires to allocate to the recognition system.

14. A method of configuring a speech recognition system on a first computer used to run the speech recognition system wherein the speech recognition system was created on a second computer, the method comprising:

providing an acoustic model including a plurality of parameters and having a model size based on a number of the parameters included in the acoustic model, the acoustic model including leaf senones on a senone tree and ancestor senones indicative of predecessor senones on the senone tree:

obtaining model size criteria; and adjusting the model size based on the size criteria by merging parameters from leaf senones to reduce a number of parameters in the acoustic model.

15. The method of claim 14 wherein obtaining model size criteria comprises:

obtaining system information indicative of operational characteristics of the first computer; and wherein adjusting the model size comprises reducing the number of parameters in the acoustic model to a desired number based on the system information.

16. The method of claim 15 wherein obtaining system information comprises:

obtaining memory capacity and operational speed of the first computer.

17. The method of claim 15 wherein obtaining system information comprises:

obtaining a user input indicative of a portion of computational resources of the first computer the user wishes to allocate to speech recognition.

18. The method of claim 14 wherein merging parameters comprises:

merging parameters from only leaf senones having a common ancestor senone.

19. The method of claim 14 wherein each leaf senone is represented by a plurality of continuous density function, each continuous density functions being parameterized by a plurality of different parameters, and wherein merging parameters comprises:

selecting two continuous density functions to be merged; and merging all of the parameters associated with the two selected continuous density functions.

20. The method of claim 14 wherein each leaf senone is represented by a plurality of continuous density functions, each continuous density function being parameterized by a plurality of different parameters, and wherein merging parameters comprises:

selecting two continuous density functions to be merged; and merging only a subset of the plurality of parameters associated with the selected continuous density functions.

21. The method of claim 20 wherein the selected continuous density functions comprise Gaussian density functions and wherein merging only a subset comprises:

merging covariances of the selected Gaussian density functions.

22. The method of claim 21 wherein merging only a subset comprises:

merging means of the selected Gaussian density functions.

23. The method of claim 14 wherein the parameters each have an associated data set and wherein merging comprises:

merging certain of the parameters based on a reduction in a likelihood of generating the first and second data sets which results from merging the parameters.

24. A speech recognition system for recognizing input speech, comprising:

a feature extractor configured to extract features from the input speech;

an acoustic model having a model size and including models of speech units;

a search engine determining a likely output based on the features extracted and based on the acoustic model; and a configuration module configured to adjust the model size based on system information corresponding to a computer system on which the speech recognition system is run, wherein the acoustic model is trained based on a training corpus and wherein the configuration module is configured to adjust the model size without accessing the training corpus.

25. The speech recognition system of claim 24 wherein the models in the acoustic model each include a plurality of parameters and wherein the configuration module is configured to obtain the system information by obtaining operational characteristics of the computer system and to reduce the number of parameters in the acoustic model to a desired number based on the operational characteristics.

26. The speech recognition system of claim 24 wherein the models of speech units include a plurality of leaf senones from a senone tree having ancestor senones, each leaf senone having at least one corresponding parameter and wherein the configuration module is configured to merge parameters in the leaf senone to reduce the number of parameters in the acoustic model to a desired size.

27. The speech recognition system of claim 26 wherein the configuration module is configured to merge parameters from only leaf senones having a common ancestor senone.

28. The speech recognition system of claim 26 wherein the configuration module is configured to selectively merge the parameters based on a reduction in likelihood of generating data sets aligned with the parameters to be merged, wherein the reduction results from merging the parameters.

* * * * *

UNITED STATES PATENT AND TRADEMARK OFFICE
CERTIFICATE OF CORRECTION

PATENT NO.   : 6,141,641
DATED        : October 31, 2000
INVENTOR(S)  : Hwang et al.

Page 1 of 1

It is certified that error appears in the above-identified patent and that said Letters Patent is hereby corrected as shown below:

Title page,
Under item [56] References: "Other Publications" Second title "Typing" should be -- Tying --.

Equations: Eq. 12 printed twice; explanatory wording misplaced; see Col. 11.

Column 12,
Line 28, "then" should be -- than --.
         "than" should be -- then --.

Signed and Sealed this

Sixteenth Day of October, 2001

Attest:

NICHOLAS P. GODICI
Attesting Officer   Acting Director of the United States Patent and Trademark Office